United States Patent

Terman

[15] 3,648,066

[45] Mar. 7, 1972

[54] THREE-PHASE DYNAMIC SHIFT REGISTER

[72] Inventor: Lewis Madison Terman, South Salem, N.Y.

[73] Assignee: International Business Machines Corporation, Armonk, N.Y.

[22] Filed: June 30, 1969

[21] Appl. No.: 837,739

[52] U.S. Cl. ..........................307/221 C, 307/208, 307/238, 307/246, 340/173

[51] Int. Cl. ..........................................................G11c 19/00

[58] Field of Search ..............307/221 C, 238, 246, 251, 279, 307/304, 208, 205; 328/37; 340/173

[56] References Cited

UNITED STATES PATENTS

| | | | |
|---|---|---|---|
| 3,524,077 | 8/1970 | Kaufman | 307/205 X |
| 3,497,715 | 2/1970 | Yao Tung Yen | 307/221 C X |

OTHER PUBLICATIONS

Atwood, Field Effect Transistor Circuits, IBM Technical Disclosure Bulletin, Feb. 1964, pp. 91 & 93.

Pomeranz et al., FET Inverter, IBM Technical Disclosure Bulletin, May 1968, p. 1823.

Dennard et al., FET Memory Cell Using Diodes as Load Devices, IBM Technical Disclosure Bulletin, Vol. 11, No. 6, Nov. 1968, pp. 592 & 593.

*Primary Examiner*—Stanley T. Krawczewicz

*Attorney*—Hanifin and Jancin and T. J. Kilgannon, Jr.

[57] ABSTRACT

A three-phase shift register comprising three-pulsed inverter stages is disclosed. More specifically, in a first embodiment, each inverter stage comprises a first field effect transistor connected through an internal node to a second field effect transistor. In a second embodiment, each inverter stage comprises a diode connected through an internal node to a field effect transistor. The node of each inverter is connected to the gate electrode of the second field effect transistor of the next inverter. When the clock of an inverter stage is pulsed, the internal node is charged through the diode or first FET and is discharged through the second FET when the clock pulse terminates, if the input on the gate electrode of the second FET causes it to conduct. If the second FET is held in a nonconducting condition, the internal node remains charged. Unconditional charging of the internal node of an inverter occurs during the application of a clock pulse and conditional discharging of the node occurs during the interval between the application of clock pulses to the different phases. Clock pulses are applied to inverters in sequence to advance an information bit through the register stage. The transistor devices shown may be PNP- or NPN-enhancement mode field effect transistors.

20 Claims, 3 Drawing Figures

INVENTOR
LEWIS M. TERMAN

BY Thomas J. Kilgannon Jr.
ATTORNEY

THREE-PHASE DYNAMIC SHIFT REGISTER

BACKGROUND OF THE INVENTION

1. Field of the Invention

This invention relates generally to multiphase shift registers which have application in computer and data systems as memory or as temporary storage locations for digital data awaiting use in following logic circuitry. More specifically, it relates to a three-phase dynamic field effect transistor shift register in which each stage of the shift register consists of three-pulsed inverter circuits each having an internal node which is connected to the control electrode of a field effect transistor in the succeeding inverter. Three-pulsed inverters, each having an associated phase, is the minimum number per shift register stage required to keep a given bit from interacting with an adjacent bit. As a result of the arrangement shown, charge redistribution effects are substantially eliminated, chip area requirements may be reduced, and faster operation is obtained because the internal node of each inverter discharges through a single device. The absence of charge redistribution effects also contributes to faster performance.

2. Description of the Prior Art

Known prior art shift register arrangements are of the two-phase or four-phase variety, and incorporate anywhere from six to eight transistors per shift register stage. A known two-phase shift register incorporates six field effect transistors (FET's). Two of the transistors are utilized as transmission gates between inverter stages. The transmission gates are controlled along with one of the inverter FET's by a clock pulse so that, upon termination of the clock pulse, the transmission gate is turned OFF and the gate capacitance of one of the field effect transistors of the next succeeding inverter is conditioned to turn its associated FET ON or OFF depending upon the initially applied input. When the succeeding inverter is pulsed, an associated transmission gate connected to the next register stage is energized, and depending upon the condition of the gate capacitance of the succeeding inverter, the first inverter of the next stage is turned ON or OFF and so on through all the inverters and shift register stages. The above described two-phase register provides a path to ground when both transistors of any inverter are ON leading to undesired power dissipation. In addition to the power dissipation problems present in this two-phase design, because of gain requirements, one of the transistors in each inverter circuit must be considerably larger than the other, thereby increasing the overall surface area requirements, the minimization of which is of paramount importance in the integrated circuit environment. Also, because the gate of a succeeding inverter must be pulled up through two devices in series, the circuit operation is slower.

Known four-phase shift registers, of course, suffer from the fact that they require an additional clock and some require more than the six transistor devices of the two-phase shift register. These disadvantages are, however, partially offset by the fact that there are no DC currents in known four-phase shift registers. All currents serve only to charge or discharge capacitances. Accordingly, there is no voltage division problem such as experienced in two-phase circuits. This permits the use of minimum size devices throughout, resulting in a substantial reduction in circuit area resulting in lower power dissipation. A voltage redistribution effect is, however, present resulting in somewhat slower circuit operation.

As indicated hereinabove, because two-phase shift registers require both large and small devices, it appears that higher circuit density can be achieved using four-phase circuitry. Knowing the size of devices and recognizing that the four-phase shift register requires smaller devices than the two-phase shift register, one could expect a reduction in the area required of two or three. However, because of the larger number of interconnections required in the four-phase shift register, the four-phase shift register requires about one-half the area of an equivalent two-phase shift register and has better performance. From the foregoing, it can be seen that the addition of clock phases does not necessarily militate against the selection of a four-phase shift register over a two-phase shift register when other factors such as area and a substantial reduction in power dissipation counterbalance the presence of additional clocks. All other factors being equal, the reduction in power dissipation and surface area required would appear to more than offset the fact that fewer transistors may be required in a shift register having fewer clock phases. Since high density along with reduced power dissipation is important in any sort of memory, any scheme which can achieve reduction in surface area by either reducing the number of devices required or their size which in turn would reduce power dissipation if no DC currents were required, would be an extremely attractive alternative to the known shift registers, all of which suffer from a lack of at least one of the above defined desirable characteristics.

SUMMARY OF THE INVENTION

The present invention, in its broadest aspect, comprises a plurality of inverters, each of which consists of a low impedance element and a controlled impedance element connected to a node. The node of one inverter is connected directly to the controlled impedance element of the succeeding inverter. Each of the inverters is connected to a voltage source which applies voltages successively to the node of each inverter. The first inverter of each shift register stage includes means for applying an information signal to the controlled impedance element thereof.

In accordance with more specific aspects of the invention, a shift register stage is provided which includes three inverter circuits each consisting of a pair of field effect transistors connected in series, each inverter being connected to its own pulsed clock. An internal node of each inverter is directly connected to the gate electrode of one of the field effect transistors in the succeeding inverter. The first inverter of a stage is controlled from an information source or from a preceding shift register stage exactly like the stage being described.

In operation, the node of the first inverter is unconditionally charged by the application of voltage from its associated pulsed clock source. The condition of the node of the first inverter which is directly coupled to the gate of a field effect transistor in the next inverter is ultimately determined when the pulsed clock source of the first inverter is turned OFF and the information source is either ON or OFF. If the information source is ON, and this action causes the field effect transistor to which the information source is connected at its gate to be turned ON, a path is provided to ground to discharge the node of the first inverter to substantially ground potential, thereby applying that potential to the gate of one of the transistors of the next inverter. If the information source conditions the transistor to which it is connected at its gate so that transistor remains OFF, the node of the first inverter remains at approximately the potential of the pulsed clock source, and this potential is applied to the control electrode of one of the transistors of the next inverter. Each succeeding inverter responds as did the first inverter with the application of a pulse from its associated pulsed clock sources and, the information signal is passed from one inverter to the next in succession until it passes from a given register stage to some output device or to the first inverter of a succeeding register stage. The passage through the three inverters of a shift register stage inverts the information which appeared at the input of the first inverter, but this is not considered deleterious since the provision of an even number of shift register stages will provide information in the same form in which it was applied to the first stage of a shift register.

The above-described shift register stage may be implemented using two field effect transistors per inverter or, in an alternative embodiment, each inverter may consist of a field effect transistor and a diode. Using either of the above arrangements, it can be seen that power dissipation is reduced to a minimum since no DC current flow is present. Only AC current flows during the unconditional charging or conditional discharging of an inverter node. Also, there is no requirement in the all-FET embodiment that the transistors of the inverter be of different sizes. Further, in the embodiment which includes diodes, a substantial reduction in chip area requirements may be attained even over the reduced area requirements of the all-FET embodiment.

It is, therefore, an object of this invention to provide a dynamic three-phase shift register which, has reduced power dissipation, reduced ship area requirements, and can be substantially faster than known prior art shift registers because voltage redistribution effects are eliminated.

Another object is to provide a dynamic three-phase shift register which is simpler to fabricate than prior art shift registers because of the easing of requirements relative to size and circuit parameters.

The foregoing and other objects, features, and advantages of the present invention will be apparent from the following more particular description of a preferred embodiment of the invention as illustrated in the accompanying drawings.

BRIEF DESCRIPTION OF THE DRAWINGS

FIG. 3 also shows an alternative diode-FET inverter arrangement in which one of the electrodes of the field effect transistor in each inverter is coupled to a common potential.

DESCRIPTION OF A PREFERRED EMBODIMENT

Figure 1:
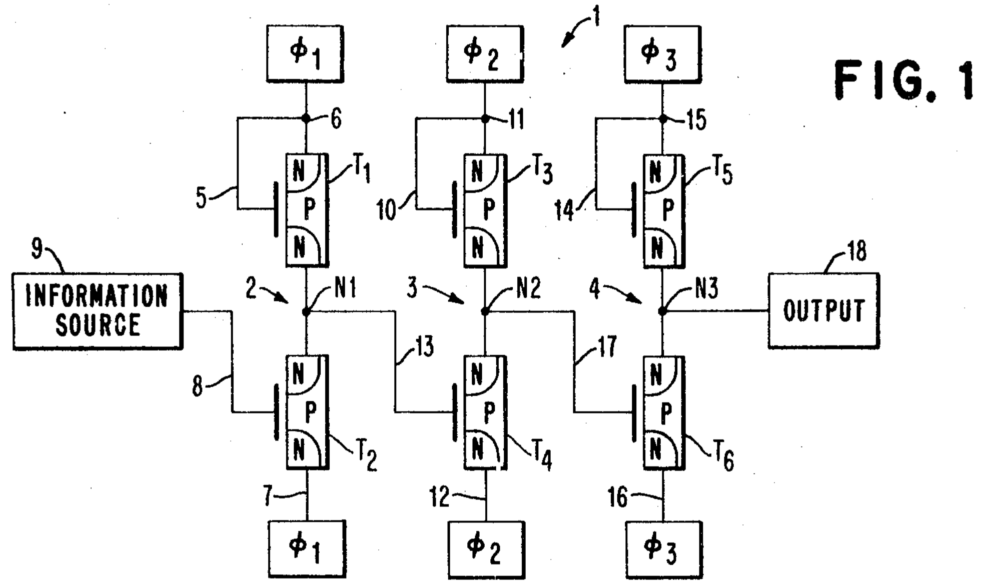
FIG. 1 is a schematic diagram of a shift dynamic three-phase shift register stage in which each of the three inverters consists of field effect transistors.

FIG. 1 shows a partial schematic, partial block diagram of a dynamic three-phase shift register 1 consisting of three inverter circuits 2, 3, and 4, respectively. Inverter 2 consists of field effect transistors T1 and T2 connected in series at an internal node N1. Gate 5 of transistor T1 is connected to the drain of transistor T1 and to a pulsed voltage source shown as a block labeled $\phi 1$ in FIG. 1. The source 7 of transistor T2 is connected to the same pulsed voltage source $\phi 1$ which, for purposes of exposition, has been shown as a separate block in FIG. 1. It should be appreciated that both of the blocks entitled $\phi 1$ are actuated simultaneously from a trigger or the like which has not been shown. A gauge or control electrode 8 of transistor T2 applies a potential which is capable of turning transistor T2 ON or OFF. Gate 8 is shown connected to a block labeled Information Source 9 which may be a source of data in binary form, for example. The connection to Information Source 9 has been shown by way of example but, it should be appreciated that gate 8 of transistor T2 could be connected equally well to the output of a shift register stage which is similar in every way to the shift register 1 presently being described.

In FIG. 1, inverter 3 consists of transistors T3 and T4 which are serially connected at a node N2. Transistor T3 has its gate 10 connected with its drain electrode 11 and both of these, in turn, are connected to a pulsed voltage source shown in FIG. 1 as a block labeled $\phi 2$. The source electrode 12 of transistor T4 is also connected to a pulsed voltage source shown in FIG. 1 as a block labeled $\phi 2$. The gate or control electrode 13 of transistor T4 is shown connected to node N1 of inverter 2.

Inverter 4 consists of transistors T5 and T6 serially connected at node N3. The gate 14 or control electrode of transistor T5 is shown connected to drain electrode 15, both of which are, in turn, connected to a pulsed voltage source shown as a block labeled $\phi 3$ in FIG. 1. The source 16 of transistor T6 is also connected to the same source of pulsed voltage $\phi 3$. The gate or control electrode 17 of transistor T3 is shown connected to node N2 of inverter 3.

In FIG. 1, node N3 is shown connected to a block 18 labeled Output. Output 18 could be the gate or control electrode of the first inverter of a succeeding register stage 1 or any other sort of device which is turned ON or OFF by the application of an appropriate output to one of its electrodes.

Each of the field effect transistors is a device well known to those skilled in the semiconductor art and, for example, could be an NPN or N-channel devices which conducts with the application of a voltage on its gate which is more positive than either its source or drain electrode. Transistors T1 through T6 in FIG. 1 could equally well be field effect transistors of the PNP or P-channel type which require the substitution of negative voltages for the positive voltages of the N-channel variety and no departure would be made from the teaching of the present invention. For the sake of simplicity and by way of example, transistors T1 through T6 will be characterized in the following description as NPN or N-channel devices which require the application of positive voltages to their electrodes to cause such a transistor to conduct.

The transistors T1 through T6 are fabricated by techniques well known to those skilled in the semiconductor fabrication arts. Briefly, to manufacture an N-channel device, a P-conductivity-type substrate of silicon, germanium, or other appropriate semiconductor is provided. A layer of insulation such as silicon dioxide, aluminum oxide or silicon nitride, is deposited on the surface of the P-conductivity-type wafer. Using photolithographic and etching techniques, two closely spaced apertures are opened in the insulating layer through which, by well known diffusion techniques, an N-type dopant such as arsenic or boron is introduced to provide regions of N-conductivity which act as the source and drain regions in the finished field effect transistor. After diffusing the N-conductivity type regions, metallization which acts as a gate and which contacts source and drain electrodes is formed in apertures in the insulating material over the diffused regions and over a previously formed thin oxide gate region between source and drain diffusions. In the case of an NPN or N-channel field effect transistor, a positive voltage on the gate and source causes the formation of an N-type channel in the P-conductivity-type region between the N-type diffusions forming a low impedance path. With no potential on the gate, the channel is not formed and the transistor is cut off providing a high impedance path to current trying to flow between source and drain. All of the transistors shown in FIG. 1 can be formed on the same substrate with appropriate metallizations utilized to obtain the desired connection between electrodes and inverters. It is, in fact, possible to provide a great number of inverter stages 1 on a single semiconductor chip so that a shift register comprised of hundreds of shift register stages can be formed on a single semiconductor chip. For a more detailed discussion of the fabrication and characteristics of field effect transistors, reference may be made to a book entitled MOSFET in Circuit Design, Texas Instrument Electronics Series, R. H. Crawford, McGraw-Hill Book Co., 1967. The primary characteristic of the field effect transistor which lends itself to the building of dynamic shift registers and the like is the ability to store charge on the gate capacitance which results from the fact that the gate or control electrode of the field effect transistor is in insulated spaced relationship with the source, drain and semiconductor substrate.

Figure 2:
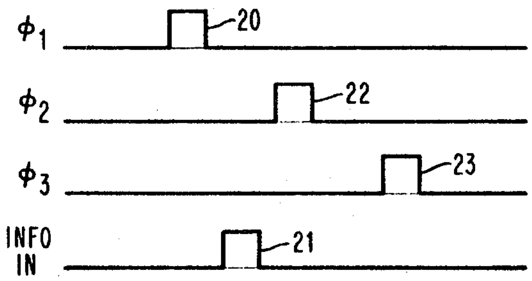
FIG. 2 is a diagram of the pulse pattern applied to each of the phases of the shift register stage of FIG. 1 showing timing relative to an information signal which is applied on the control electrode of a field effect transistor of the first inverter.

Referring now to FIG. 1 and to FIG. 2 which shows the timing of an information pulse relative to the clock pulses of each of the phases, the pulse pattern shown is that which is utilized when shift register stage 1 is assumed to be the first stage of a plurality of similar shift register stages. In the condition where no clock pulses are applied and no information is applied to shift register stage 1, all gate capacitances of transistors T1 through T6 are in a discharged condition. As indicated hereinabove, transistors T1 through T6 are assumed to be N-channel transistors of substantially identical characteristics.

Referring now to FIG. 2, pulsed clock source $\phi1$ is energized and a voltage pulse 20 is applied to inverter 2. The application of pulse 20 to inverter 2 turns transistor T1 ON and unconditionally charges up gate or control electrode 13 of transistor T4 via node N1 of inverter 2. Cessation of pulse 20 from pulse source $\phi1$ turns transistor T1 OFF thereby eliminating a discharge path for the charge stored on the gate capacitance of transistor T4. At this point, if information source 9 is activated, transistor T2 is turned ON by the application of information pulse 21 (representing a binary one condition) to gate 8 of transistor T2. Turning transistor T2 ON provides a discharge path for the charge stored on the gate capacitance of transistor T4 since the $\phi1$ source is now at substantially ground potential. It should be noted that the discharge of the gate capacitance of transistor T4 via transistor T2 has occurred in the interval between the application of clock pulses from sources $\phi1$ and $\phi2$. This is significant from a speed of operation point of view since the known two-phase and four-phase shift registers discussed hereinabove require the application of a clock or phase pulse to discharge information stored on the gate capacitances of their transistors. It should also be noted that information pulse 21 which, for example, could be representative of a binary "one" condition appears at gate 13 of transistor T4 as ground potential indicating that as information passes from one inverter to the next, the information is inverted. In what follows, it will be seen that a binary "one" condition at the input of shift register stage 1 appears as a binary "zero" at the output of the last inverter of shift register stage 1, and, vice versa. It should be appreciated that the duration of pulse 21 in FIG. 2 is the minimum duration required and is shown in this fashion only by way of example. Pulse 21 may overlap pulse 20 and 22, for example, without deleteriously affecting the operation of register stage 1 in any way.

The unconditional charging of the gate capacitance of transistor T4 and discharge thereof via transistor T2 having occurred, the $\phi2$ pulsed source applies a pulse 22 to inverter 3. The application of pulse 22 to inverter 3 turns transistor T3 ON, thereby charging up the gate capacitance associated with gate 17 of transistor T6 via node N2. During the application of pulse 22 from pulse source $\phi2$, transistor T4 remains in the OFF condition since the potential on the gate capacitance thereof is substantially at ground potential. Once pulse source $\phi2$ turns OFF, both transistors T3 and T4 are in the OFF or nonconducting condition and the charge on the gate capacitance of transistor T6 is presented with two high impedance paths to ground. As a result, the gate capacitance of transistor T6 remains charged up to the value of the voltage of pulse 22. Once again, it should be noted that the information appearing at gate 17 of transistor T6 has been inverted from what it was on the gate 13 of transistor T4 and is the same as applied to the gate of transistor T2.

Once the gate capacitance of transistor T6 is charged, pulse source $\phi3$ applies a clock pulse 23 to inverter 4. The application of pulse 23 to inverter 4 turns transistor T5 and T6 ON since both of these transistors have positive potentials applied to their gates 14 and 17, respectively and to their sources 15 and 16, respectively. As a result, output 18 which may be the gate capacitance of a transistor of the first inverter of a succeeding shift register stage is charged up via transistors T5, T6, and node N3. The cessation of clock pulse 23 turns transistor T5 OFF but transistor T6, with its gate capacitance charged to approximately the potential of pulse source $\phi2$ and with the potential of $\phi3$ appearing at node N3 from the output 18, remains in the ON or conducting state. As a result, the information on output 18 discharges via transistor T6 to ground potential. Output 18, assuming it to be the gate capacitance of a transistor of the first inverter of a succeeding register stage, would have ground potential applied at its gate, and upon the application of a pulse from its source $\phi1$, that inverter would operate in exactly the same manner as described in connection with inverter 3.

When the information applied from information source 9 is held at ground potential which, for example, may be representative of a binary "zero", transistor T2 of inverter 1 is held in the OFF or nonconducting condition so that upon removal of the voltage from pulsed source $\phi1$, the charge stored on the gate capacitance associated with gate 13 of transistor T4 "-sees" a high impedance at node N1 because both transistors T1 and T2 are in the OFF or nonconducting condition, and remains at the voltage to which it was charged during the $\phi$, pulse 20. Upon application of the $\phi2$ pulse, node N2 which is connected to the gate 17 of transistor T6, is unconditionally charged and, upon removal of the pulse from pulse source $\phi2$, because transistor T4 is in the ON or conducting condition, the gate capacitance of transistor T6 discharges via node N2 through transistor T4 to ground. Upon application of the $\phi3$ pulse, node N3 charges up via transistors T5 and T6 because both are in the ON or conducting condition and, upon removal of the $\phi3$ pulse, the node N3 which is connected to the gate capacitance of some output device 18 discharges via node N3 and transistor T6 which remains in the operating condition after the pulse from source $\phi3$ ceases. As with the situation where a pulse was applied to inverter 2 from information source 9, where ground potential is applied to inverter 2 initially, the resulting output from shift register stage 1 is inverted and appears at output 18 as a potential approximately equal to that of the pulsed source $\phi3$ associated with inverter 4.

At this point, it should be appreciated that at least three inverter stages are required to pass a given bit from input to output. For example, if only two inverters and two pulsed sources $\phi1$ and $\phi2$ were utilized, information stored at the node of the second inverter would be destroyed upon the application of the $\phi1$ pulsed source to bring new information into the shift register stage and store it at the node N1 of the first inverter. Considering only inverters 2 and 3 and assuming that node N2 has been charged up and remains in this condition after the termination of a pulse from pulse source $\phi2$, pulse source $\phi1$ is again actuated to bring information into inverter 2. Because the application of a pulse from pulse source $\phi1$ to inverter 2 unconditionally charges node N1 to a potential, information in the form of stored charge at node N2 will be discharged to ground via transistor T4 because a positive potential is applied to both gate 13 and node N2. Where node N2 is at ground potential, this does not destroy the information, but if node N2 is charged to a potential, the application of a pulse from source $\phi1$ will discharge this information to ground via transistor T4, thereby destroying that information. The novel arrangement of the present invention resulted from the recognition that a plurality of identical inverters each containing identical transistors could be utilized if the node of an inverter were unconditionally charged during a clock pulse interval and conditionally discharged during an interval between clock pulses, and if the destruction of information in adjacent inverters were avoided by the addition of a third inverter and clock interval. Using these concepts, the application of voltages to the first inverter of a shift register stage would not destroy a previously introduced information bit. As a result of this recognition, device fabrication has been simplified, faster operation is obtained by eliminating the charge redistribution effect and power dissipation has been substantially reduced over known prior art shift registers. The use of transmission or isolation gates by the prior art allowed two phases to be used but at the expense of larger surface area requirements, lower speed, and higher power dissipation.

Figure 3:
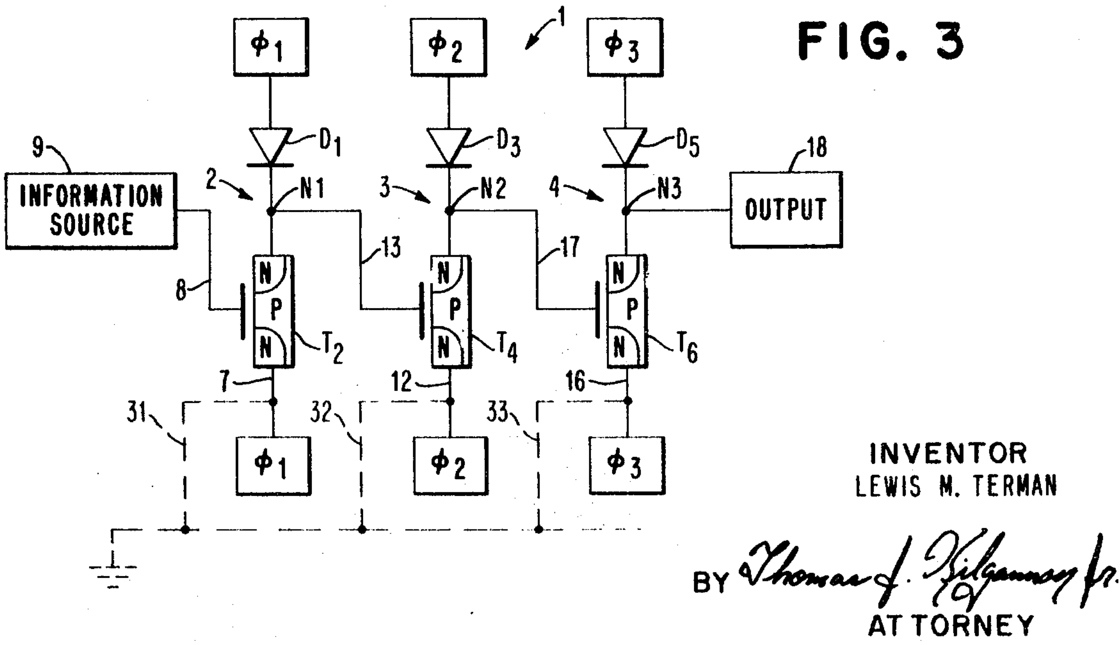
FIG. 3 is a schematic diagram of a dynamic three-phase shift register stage in which one field effect transistor of each inverter has been replaced by a diode.

Referring now to FIG. 3, a shift register 1 is shown in which diodes D1, D3, and D5 have been substituted for the transistors T1, T3, and T5 of FIG. 1. Since the diodes D1, D3, and D5 are low impedance elements when forward-biased, and high impedance elements in the backward-biased condition, they operate exactly as transistors T1, T3, and T5 when the pulsed clock sources $\phi1$, $\phi2$, and $\phi3$, respectively, are applied and subsequently removed. Thus, the application of pulse 20 from source $\phi1$ unconditionally charges up node N1 in the same manner as node N1 was charged up when $\phi 1$ was applied via transistor T1 of FIG. 1. The operation of the diode-FET inverter implementation of FIG. 3 is exactly the same as the operation of shift register stage 1 of FIG. 1.

In FIG. 3, the sources 7, 12, and 16 of transistors T2, T4, and T6, respectively are shown connected by dotted lines 31, 32, and 33, respectively, to ground potential. In this alternative arrangement, the conductance of diode D1 must be sufficiently greater than that of transistor T2 to insure the pulling up of node N1 -- that is, to provide sufficient charge to unconditionally charge up the gate capacitance of transistor T4 during the application of pulse 20. In the grounded drain arrangement, the loading on the clock pulse sources $\phi 1$, $\phi 2$, and $\phi 3$ will be somewhat greater since DC current can flow when a clock pulse is applied. However, the performance should be faster because of the lower impedance with diodes, and the surface area on the chip should be somewhat reduced over the surface area required in implementing the shift register stage of FIG. 1.

No specific parameters relating to the field effect transistor and diode characteristics are being set forth because the requirements are such that practically any enhancement mode device, either as discrete devices or in monolithic form, if operated and connected as taught, will be operable. Standard handbook transistors and diodes may be utilized.

In the foregoing specification, the terms "unconditionally" charged and "conditionally" discharged have been used. Lest there be any confusion as to their meaning, it should be understood that "unconditionally charged" means that a node and its associated capacitance are charged to the potential of the clock whenever the clock is actuated. "Conditionally" discharged means that a node or its associated capacitance is either maintained in a charged condition or discharged depending on whether or not a low impedance path for the discharge is provided by a two-condition element.

While the invention has been particularly shown and described with reference to a preferred embodiment, it will be understood by those skilled in the art that the foregoing and other changes in form and details may be made therein without departing from the spirit and scope of the invention.

What is claimed is:

1. A shift register stage comprising, first, second and third circuits each containing a node connected to an element responsive to the presence of electrical charge;
   means connected to each of said circuits for unconditionally applying charge to said elements via said nodes during discrete nonoverlapping pulse intervals, and
   means connected to each of said circuits for one of maintaining said charge and discharging said elements via said nodes during intervals between said discrete pulse intervals.

2. A shift register stage according to claim 1 further including means for applying information to said first of said circuits.

3. A shift register stage according to claim 1 wherein said element responsive to the presence of electrical charge is the gate capacitance of a field effect transistor.

4. A shift register stage according to claim 1 wherein said means for unconditionally applying charge to said elements includes a pulsed voltage source, and, at least a single low impedance element connected in series with said voltage source and said node.

5. A shift register stage according to claim 4 wherein said at least a single low impedance element is a field effect transistor, the source and gate of which are connected to said pulsed voltage source.

6. A shift register according to claim 4 wherein said at least a single low impedance element is a forward-biased diode.

7. A shift register according to claim 6 wherein said forward-biased diode is a Schottky barrier diode.

8. A shift register stage according to claim 1 wherein said means for one of maintaining said charge and discharging said elements is a controlled impedance device which is in one of a conducting and nonconducting condition during intervals between said discrete pulse intervals.

9. A shift register stage according to claim 8 wherein said controlled impedance device is an insulated gate field effect transistor.

10. A shift register stage according to claim 2 wherein said means for applying information to said first of said circuits includes a pulsed voltage source.

11. A shift register stage comprising a plurality of inverters each including only an element having a unidirectional characteristic and a controlled impedance element connected to a node, the node of one inverter being directly connected to the controlled impedance element of the succeeding inverter,
   an actuable source having an actuated and an unactuated state connected to each of said inverters said sources being actuated during different discrete nonoverlapping intervals to condition the controlled impedance element of a succeeding inverter, and,
   means connected to said shift register stage for setting the state of each of the controlled impedance elements during the unactuated state immediately succeeding the actuation of an actuable source.

12. A shift register stage according to claim 11 wherein said means for setting the state of each of the controlled impedance elements includes means for applying information to the controlled impedance element of the first inverter of said register stage.

13. A shift register stage according to claim 11 wherein the first of said plurality of inverters is connected to a similar shift register stage and the last of said plurality of inverters is connected to a similar shift register stage.

14. A shift register stage according to claim 12 wherein said means for applying information is a pulsed voltage source.

15. A shift register stage according to claim 12 wherein said element having a unidirectional characteristic is a field effect transistor, the source and gate of which are connected together and said controlled impedance element is a field effect transistor.

16 A shift register stage according to claim 15 wherein said field effect transistors are NPN-semiconductor devices.

17. A shift register stage according to claim 15 wherein said field effect transistors are PNP-semiconductor devices.

18. A shift register stage according to claim 12 wherein said element having a unidirectional characteristic is a forward-biased diode and said controlled impedance element is a field effect transistor.

19. A shift register stage according to claim 18 wherein said diodes are Schottky barrier devices and said field effect transistors are NPN-devices.

20. A shift register stage according to claim 18 wherein said diodes are Schottky barrier devices and said field effect transistors are PNP-devices.

* * * * *